United States Patent [19]

Stackhouse, Jr. et al.

[11] 4,025,324
[45] May 24, 1977

[54] HYDROCARBON VAPOR CONTROL UNIT AND SYSTEM

[75] Inventors: James H. Stackhouse, Jr.; Edward G. Craze, Jr.; John A. Morrison, all of Richmond, Va.; Joseph T. Scheurich, Beaumont, Tex.

[73] Assignee: Texaco Inc., New York, N.Y.

[22] Filed: Sept. 8, 1975

[21] Appl. No.: 611,058

[52] U.S. Cl. .................................... 55/179; 55/387
[51] Int. Cl.² ........................................ B01D 53/04
[58] Field of Search .......... 23/277 C, 288 F; 55/74, 55/88, 179, 387, DIG. 30; 110/8 A; 220/85 VR, 85 VS; 252/444, 452; 431/5, 158, 202, 326, 352

[56] References Cited
UNITED STATES PATENTS

| | | | |
|---|---|---|---|
| 2,121,733 | 6/1938 | Cottrell | 110/8 A |
| 3,042,499 | 7/1962 | Williams, Sr. | 23/277 C |
| 3,352,294 | 11/1967 | Biller et al. | 55/74 X |
| 3,543,484 | 12/1970 | Davis | 55/387 |
| 3,581,782 | 6/1971 | Onufer | 55/387 X |
| 3,683,597 | 8/1972 | Beveridge et al. | 55/387 X |
| 3,831,353 | 8/1974 | Toth | 55/DIG. 30 |
| 3,836,338 | 9/1974 | Arnold | 23/288 F |
| 3,870,474 | 3/1975 | Houston | 55/DIG. 30 |
| 3,897,193 | 7/1975 | Kattan et al. | 23/277 C X |
| 3,902,874 | 9/1975 | McAndrew | 55/387 X |
| 3,914,095 | 10/1975 | Straitz | 23/277 C X |

Primary Examiner—Frank A. Spear, Jr.
Assistant Examiner—Robert H. Spitzer
Attorney, Agent, or Firm—Thomas H. Whaley; Carl G. Ries; Henry C. Dearborn

[57] ABSTRACT

A hydrocarbon vapor control system for preventing escape to the atmosphere, and for disposing of such vapors by clean burning. It includes a pair of adsorption beds and means for alternatively connecting them to receive the vapor while the other one of the beds is being regenerated with the effluent vapor from the regeneration being burned. There is a hydrocarbon detector at the outlet of each adsorption bed to determine when it has become saturated.

A hydrocarbon vapor control unit includes a canister with an inlet at the bottom to admit the vapor. There is a support for an adsorption bed in the canister, and there is an outlet at the top which is designed to permit burning the effluent when the adsorption bed is being regenerated by air flow through the inlet.

15 Claims, 3 Drawing Figures

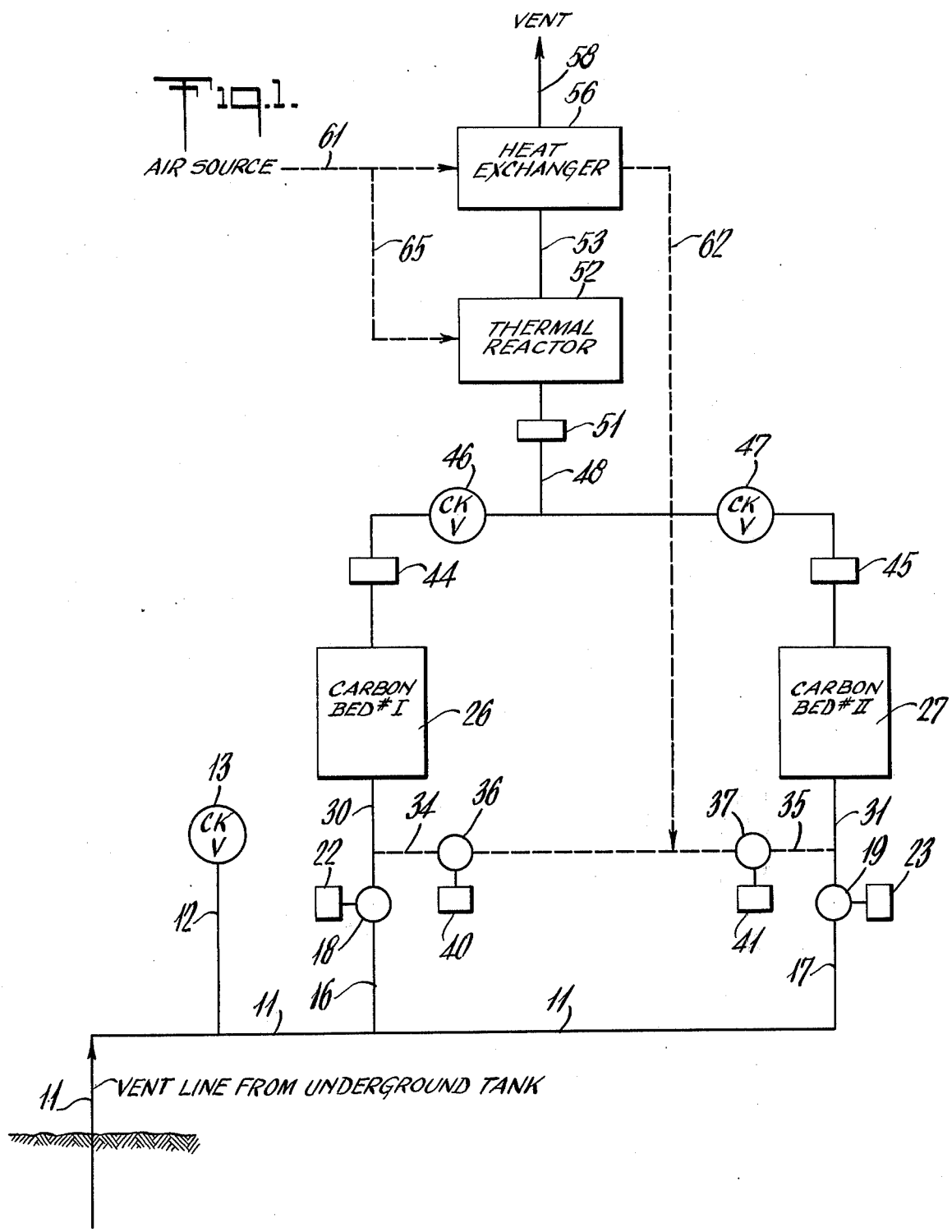

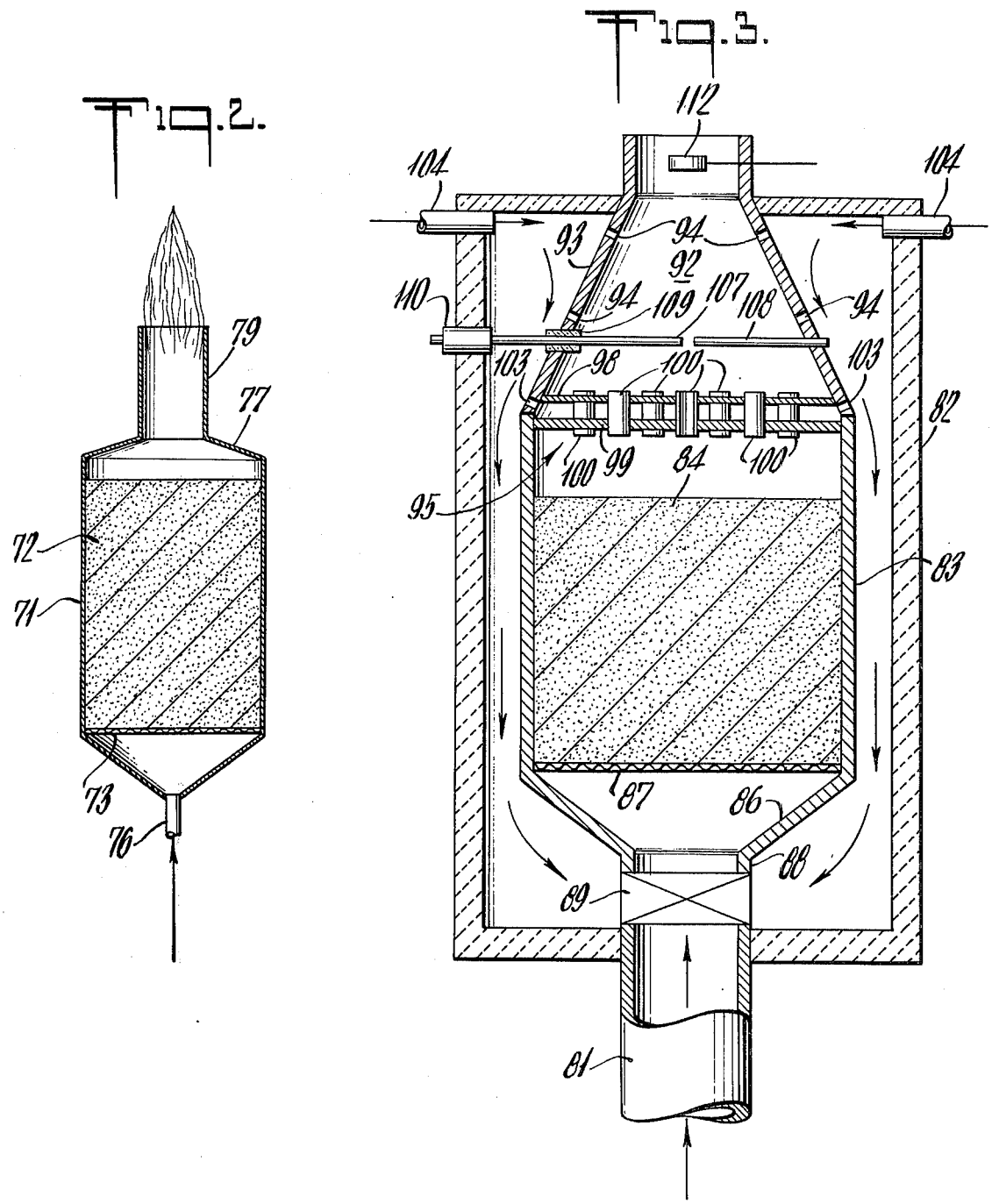

1

HYDROCARBON VAPOR CONTROL UNIT AND SYSTEM

CROSS-REFERENCE TO RELATED APPLICATION

A co-pending application serial no. 556,374 filed Mar. 7, 1975 (D No. 3,594), now U.S. Pat. No. 3,796,969, deals with the structure for a hydrocarbon vapor detector. Such a detector may be employed as one element in the combination or combinations of this application.

BACKGROUND OF THE INVENTION

1. Field of the Invention

This application concerns hydrocarbon vapor control, in general, and more specifically deals with a hydrocarbon vapor control system as well as a hydrocarbon vapor control unit. The latter may be separately employed or incorporated into such a system.

2. Description of the Prior Art

Heretofore, it has been suggested that a system for removing organic contaminants from air might include parallel adsorbers with interconnections for employing one adsorber to remove the contaminants while the other adsorber is being regenerated, e.g. see U.S. Pat. No. 3,455,089. However, such a system is not specifically applicable to the removal of hydrocarbon vapors from underground tanks with the special benefits stemming from employing combustion of the removed hydrocarbon vapors. This avoids contamination without having the expense of changing absorbing units after they become saturated.

At the same, this invention permits determination of the state of hydrocarbon vapor saturation at the adsorbers so that the change over may be made at the most opportune time. Also, the system employed by this invention is substantially simplified, so that it is more economical and consequently provides benefits not available from the prior art.

In addition, this invention provides for an improved thermal reactor. Such a reactor has simple structure and it enables the burning of hydrocarbon vapors with sufficient air mixture to make a very clean burn. Consequently, it eliminates all contamination of the atmosphere by hydrocarbon vapors.

Another advantage of this invention relates to the structure for a hydrocarbon vapor control unit, which may be used as a portable burner so that beneficial use may be made of the recovered hydrocarbon vapors. Such structure may have the beneficial attributes of a simple unit which may be used as a portable stove or the like. Such a stove is complete with the mere introduction of pressurized air to contol the combustion of the vapors from the unit.

SUMMARY OF THE INVENTION

Briefly, this invention concerns a hydrocarbon vapor control system for eliminating discharge of hydrocarbon vapors from underground storage tanks and the like, during product handling and storage. Such a system comprises, in combination, a pair of means for containing an adsorption bed for removing said hydrocarbon vapor from a vent line connected to at least one of said storage tanks. It also comprises means for alternatively connecting one of said adsorption beds to said vent line, and means associated with said adsorption beds for detecting the presence of said hydrocarbon vapor in the effluent therefrom. It also comprises a thermal reactor connected to receive the effluent from said adsorption beds and having means for supplying air to support combustion in the reactor, and means for igniting said vapor in said thermal reactor after the presence of said hydrocarbon vapor has been detected.

Again briefly, the invention concerns a hydrocarbon vapor control system for eliminating discharge of hydrocarbon vapors from underground storage tanks and the like during product handling and storage, which comprises in combination a pair of canisters each containing an adsorption bed of activated carbon for removing said hydrocarbon vapor from a vent line connected to at least one of said storage tanks. It also comprises conduit and valve means for alternatively connecting one of said canisters to said vent line, and a hydrocarbon detector located in the output from each of said canisters for detecting the presence of said hydrocarbon vapor in the effluent therefrom. It also comprises a thermal reactor having an additional activated carbon bed therein and a burner head for controlling combustion of said hydrocarbon vapor, the said reactor includes means for supplying air to support said combustion. It also comprises spark electrode means for igniting said vapor at said burner head, and a heat exchanger connected to said air supply means and to said combustion products to preheat air to be passed through the alternative one of said pair of canisters not connected to said vent line. It also comprises a flame arrester connected between said pair of canisters and said thermal reactor, and means for venting combustion products to the atmosphere.

Again briefly, the invention concerns a hydrocarbon vapor control unit which comprises in combination, a canister having an inlet for said vapor at the bottom thereof, and means for supporting an adsorption bed in said canister to adsorb vapor thereon. It also comprises an outlet at the top of said canister.

Once more briefly, the invention concerns a hydrocarbon vapor control unit which comprises in combination a canister having an inlet for said vapor at the bottom thereof, and means for supporting a bed of activated carbon for adsorpting said vapor thereon. It also comprises an outlet at the top of said canister comprising a burner for combustion of said vapor when air is admitted through said inlet. The said burner comprises a flame holder having a pair of vapor barriers spaced apart from one another and a plurality of burner nozzles extending through said barriers. The said flame holder also has means for admitting air into said space between barriers to cool said nozzles, and said burner also comprises a combustion chamber having heat conductive walls for preheating said inlet air and spark electrode means for igniting said hydrocarbon vapor. In addition it comprises, a housing surrounding said canister and forming an annulus therearound, and means for introducing air into said annulus near the top thereof. It also comprises three-way valve means for controllably connecting said inlet to said annulus near the bottom thereof and to a conduit for said hydrocarbon vapor, and a hydrocarbon vapor detector located in said outlet. It also comprises means for admitting secondary air into said combustion chamber from said annulus to insure a clean burn.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein:

FIG. 1 is a schematic diagram illustrating a system according to the invention;

FIG. 2 is a longitudinal cross-section in schematic form, illustrating a hydrocarbon vapor control unit according to the invention; and FIG. 3 is a longitudinal cross-section in schematic form, illustrating a more comprehensive vapor control unit according to the invention, which includes a section for pre-heating the air that is introduced to the unit during combustion of the hydrocarbon vapors.

DESCRIPTION OF THE PREFERRED EMBODIMENTS

In the past, it has not been economically feasible to eliminate hydrocarbon vapors which tend to form in the space above the product and be discharged from the vent or vents that are employed in connection with underground tanks of gasoline and the like, at service stations or bulk stations, etc. However, under today's regulations and restrictions it becomes mandatory to control such vapor emissions to the general atmosphere. This invention provides for an efficient and economically feasible system, and it includes an individual unit or units which may be employed therein. It provides for avoiding any atmospheric contamination by removing and eliminating all such hyrocarbon vapors in an efficient and safe manner.

FIG. 1 illustrates a system for handling hydrocarbon vapors from underground storage tanks or the like. It will be noted that there is a vent line 11 that is connected to the space above a hydrocarbon product, such as gasoline or the like which is contained in one or more underground tanks (not shown). There is another conduit or vapor line 12 that is connected to the vent line 11 and that has a check valve 13 at the open end thereof. This is provided in order to avoid the creation of a vacuum in the tank or tanks to which the vent line 11 is connected.

The vent line 11 continues and is connected to each of two vapor lines 16 and 17. These lines lead to control valve 18 and 19 respectively which may have manual or automatic controllers 22 and 23 respectively. These valves 18 and 19 are alternatively actuated in order to control the flow of the hydrocarbon vapors from vent line 11 to the system.

The system includes a pair of canisters 26 and 27 which are indicated by the captions "carbon bed No. I" and "carbon bed No. II" respectively. Each includes a bed of activated carbon for adsorption of hydrocarbon vapors. In each case the input to the canister is connected from the valve 18 and 19 respectively via a conduit or vapor line 30 and 31. Also, it will be observed that there is a connecting line or conduit 34 and 35 in each case, which goes from a valve 36 and 37 respectively, to control the passage of air through the lines 34 and 35. Of course, the valves 36 and 37 each have a manual or automatic control element 40 and 41 respectively in order to determine the opening and closing of these valves.

The outputs from the canisters 26 and 27 go to hydrocarbon detectors 44 and 45 respectively which, as indicated above, may take various forms but preferably will be like the detector described in the co-pending application mentioned above. The output flow of vapor, in each case, then continues via a check valve 46 and 47, respectively, to join a common vapor (or vapor and air mixture) output line 48 that connects to a flame arrester 51. From the flame arrester 51 the vapors then go to a thermal reactor 52 where the hydrocarbon vapors are incinerated and from which the combustion products are directed via a line 53 to a heat exchanger 56. Thereafter, the combustion products are discharged to atmosphere, as indicated by a line 58 that has the caption "Vent" applied.

It will be observed that there is a conduit or line 61 which has an input adapted for connection to an air source, as indicated by the caption. This source may be a compressed air tank, or the like (not shown) that is usually to be found at a gasoline service station or other product handling facility where a system according to the invention will be used. The air line 61 is connected directly to the heat exchanger 56, and thereafter the heated air goes via a line 62 to the valves 36 and 37. Then it is controllably introduced to the input lines 30 and 31 respectively and alternatively, as desired.

It should be noted that the thermal reactor 52 might take various forms. In particular, it may be a simple burner structure (not shown) which provides for the ignition and combustion of the hydrocarbon vapors from carbon beds 26 and 27, when mixed with air. In this regard, it will be noted that there is a branch air line 65 that leads from the line 61 and goes to the thermal reactor 52 for providing the air necessary to support combustion. It will also be appreciated that the reactor 52 may take a more complex form, such as that illustrated in FIG. 3 and described in more detail below.

OPERATION

The operation of FIG. 1 may be described in connection with the use which has been indicated. It concerns control of hydrocarbon vapors from a product handling operation, or from a storage operation such as generally contemplated. Thus, to begin a cycle of vapor control let us assume that the valves 19 and 36 are both closed. Each valve is, of course, under control of its operator 23 or 40 respectively, in each case. It will be understood that these may be solenoid actuated operators if desired.

The hydrocarbon vapors flowing in the vent line 11 will flow only through the line 16 and the open valve 18 to carbon bed number I, i.e. canister 26, via the input line 30. This bed of activated carbon will then adsorb the hydrocarbon vapors until it becomes saturated. At that time the vapors will be detected by the detector 44, and the valves 18 and 37 will be closed while simultaneously the valves 19 and 36 will be opened. Therefore, the hydrocarbon vapors will be switched over and flow into the inlet line 31 of the canister 27 to be absorbed by the activated carbon in carbon bed number II.

When the switch over the vapor flow takes place, the vapors that were adsorbed on the carbon bed number I will be swept out as that bed is regenerated by the flow of air through the air source lines 61 and 62 to the now open valve 36. This air flow continues into the input for the canister 26, i.e. carbon bed number I. Also at this time, the hydrocarbon vapors will be driven into the thermal reactor 52 and it will be ignited so that the vapors are incinerated with a clean burn since sufficient air is introduced via the line 65 to the reactor 52. Hot combustion products will flow via the output lines 53 and through heat exchanger 56 to the vent line 58 for discharge to the atmosphere. The hot combustion products will cause a heating of the incoming air through the heat exchanger 56 so that the regeneration process will be aided by the pre-heating of regeneration air that is being introduced to the canister 26.

During the regeneration process of carbon bed number I just described, the hyrocarbon vapors are being introduced from the vent line 11 into carbon bed number II, i.e. the canister 27. Consequently, the vapors will be adsorbed on that carbon bed so that only clean air continues via the detector 45 and the check valve 47 into the input line 48 of the thermal reactor 52. Of course, the size of the carbon beds 26 and 27 as well as other elements of the system will be designed to permit the desired continuous operation with complete control of the hydrocarbon vapors being discharged from the underground tank or other source.

FIG. 2 illustrates a simple hydrocarbon vapor control unit. As indicated above, this may be employed to eliminate hydrocarbon vapors by adsorption thereof on a bed of adsorbent. Then, after the vapors have been stored the unit may be employed as a portable burner. This operates very satisfactorily so long as there is a source of input air to supply the neccessary combustion mixture.

The simple control unit illustrated in FIG. 2 may take various physical forms. It is schematically illustrated as a cylindrical canister 71 which contains a bed of activated carbon 72 therein that is supported on a screen 73. The bottom of the canister 71 is closed except for an inlet conduit 76 through which a supply of air may be introduced in any feasible manner. The top of the canister 71 has a tapered section 77 that connects to a burner stack 79 which supports the combustion flames of the effluent hydrocarbon — air mixture from the bed 72. It will be understood that the amount of input air through conduit 76 may be varied to control the combustion. By proper regulation, it has been found that the combustion product obtained produces a very clean blue flame.

It may be noted that the simple burner structure according to the foregoing FIG. 2 illustration, may be used in controllng hydrocarbon vapors as an adsorbing bed until the bed has become saturated. Also, as indicated, the structure is quite adaptable for mere disposal of the vapors by burning. The carbon bed will be regenerated by the air that is being introduced through the inlet 76 during the burning procedure. Also as already suggested, the unit may be employed (following saturation) as a portable heater such as a camp stove or the like. It has been found that the vapor-air mixture ignites easily and the flame goes out immediately when the air supply is cut off.

FIG. 3 illustrates a vapor control unit which may be employed as the thermal reactor in the system according to FIG. 1, if desired. However, the unit according to FIG. 3 is more comprehensive and includes additional elements relative to a simple burner per se, which was suggested in the FIG. 1 description.

The unit illustrated in FIG. 3 includes an inlet pipe or conduit 81 through which hydrocarbon vapors to be controlled will flow. The unit also has a housing 82 which surrounds and encloses a canister 83. The canister 83 contains a bed of activated carbon 84 that is supported by a screen 87. The bottom of the canister 83 has a tapered section 86 that connects to an inlet portion 88 of the canister. The inlet 88 is connected to one of the outlet ports of a three-way valve 98 which is schematically indicated.

The top of the canister 83 is constructed so that the outlet portion makes up a burner section that includes a combustion chamber 92 that has tapered side walls 93, with a plurality of small holes 94 therethrough in order to permit entry of secondary air into the combustion chamber 92.

The burner section of the unit includes a flame holder 95 situated spaced somewhat above the carbon bed 84. This flame holder 95 is made up of a pair of vapor barriers 98 and 99 that are spaced apart from one another, and have attached to both of them a plurality of burner nozzles 100 which extend from below the lower barrier 99 to above the upper barrier 98. In addition, there are some openings 103 through the side wall 93 near the base thereof. These openings 103 act to admit air into the space between barriers 98 and 99 in order to cool the nozzles 100.

Near the top of the housing 82 there are a plurality of conduits or pipes 104 which are for introducing air into the annulus surrounding the canister 83 inside of the housing 82. This air may be supplied from a compressed air source, and after it is introduced into the top of the annulus it flows down around the canister 83, as indicated by the arrows. Then, depending up on the setting of the three-way valve 89, it will flow in through the inlet 88 to the inside of the canister 83.

It will be observed that the air flowing in through the pipes 104 makes contact with and flows over the surface of the side walls 93 of the combustion chamber 92. Consequently, there is a pre-heating of this air prior to its introduction to the bottom of the carbon bed 84.

It will also be observed that there is a pair of spark electrodes 107 and 108. The electrode 108 is attached directly to the metallic canister 83 in the tapered wall section 98, so that it is electrically connected to a ground return circuit. The other electrode 107 is insulated from ground by a non-conductive sleeve 109 which keeps it from electrically contacting the walls of the combustion chamber 92. Similarly, there is another insulating sleeve 110 that surrounds the electrode 107 where it passes through the housing 82. It will be appreciated that any conventional high voltage source may be applied to the electrodes 107 and 108 in order to produce an electric spark for igniting the hydrocarbon vapor and air mixture when desired.

It will noted that there also may be a hydrocarbon detector 112 located in the outlet from the canister 83, i.e. at the top of the combustion chamber 92. This detector 112 may take any desired form. However, it is preferred to use a simple and effective hydrocarbon detector like that which is referred to above in regard to the co-pending application.

It will be appreciated that if a thermal reactor unit according to FIG. 3 is employed in the system according to FIG. 1, there would be some modifications called for. For example, the flame arrester 51 could be eliminated since the carbon bed and flame holder of the reactor unit would take its place.

Also, the carbon bed 84 would act as a reservoir for hydrocarbon vapors which would permit more complete regeneration of the carbon beds No. I and No. II. In addition, the heat exchanger 56 would not be a separate element distinct from the thermal reactor, since the tapered walls 93 of the combustion chamber 92 provide the heat exchange for pre-heating the purge air. Of course, some additional piping connection would have to be made into the housing 82 for the preheated air line 62 of the FIG. 1 system.

While particular embodiments according to the invention have been described above in considerable detail in accordance with the applicable statues, this is not to be taken as is any way limiting the invention but merely as being descriptive thereof.

We claim:

1. Hydrocarbon vapor control system for eliminating discharge of hydrocarbon vapors from underground storage tanks and the like during product handling and storage, comprising in combination
    a pair of means for containing an adsorption bed for moving said hydrocarbon vapor from a vent line connected to at least one of said storage tanks,
    means for alternatively connecting one of said adsorption beds to said vent line,
    means associated with said adsorption beds for detecting the presence of said hydrocarbon vapor in the effluent therefrom,
    a thermal reactor connected to receive the effluent from said adsorption beds and having means for supplying air to support combustion in the reactor, and
    means for igniting said vapor in said thermal reactor after the presence of said hydrocarbon vapor has been detected.

2. Hydrocarbon vapor control system according to claim 1, also comprising
    a heat exchanger connected to said means for supplying air and having said combustion products pass therethrough to preheat air to be passed through the alternate one of said adsorption beds not connected to said vent line.

3. Hydrocarbon vapor control system according to claim 2, wherein
    said thermal reactor comprises an additional adsorption bed and a burner head for controlling said combustion in the reactor.

4. Hydrocarbon vapor control system according to claim 3, wherein
    said adsorbtion beds comprise activated carbon.

5. Hydrocarbon vapor control system according to claim 4, wherein
    said combustion products are vented to the atmosphere.

6. Hydrocarbon vapor control system according to claim 5, also comprising
    a flame arrester connected between said adsorption beds and said thermal reactor.

7. Hydrocarbon vapor control system for eliminating discharge of hydrocarbon vapors from underground storage tanks and the like during product handling and storage, comprising in combination
    a pair of canisters each containing an adsorption bed of activated carbon for removing said hydrocarbon vapor from a vent line connected to at least one of said storage tanks,
    conduit and valve means for alternatively connecting one of said canisters to said vent line,
    a hydrocarbon detector located in the output from each of said canisters for detecting the presence of said hydrocarbon vapor in the effluent therefrom,
    a thermal reactor having an additional activated carbon bed therein and a burner head for controlling combustion of said hydrocarbon vapor,
    said reactor including means for supplying air to support said combustion,
    spark electrode means for igniting said vapor at said burner head,
    a heat exchanger connected to said air supply means and to said combustion products to pre-heat air to be passed through the alternate one of said pair of canisters not connected to said vent line,
    a flame arrester connected between said pair of canisters and said thermal reactor, and
    means for venting combustion products to the atmosphere.

8. Hydrocarbon vapor control unit, comprising in combination
    a canister having an inlet for said vapor at the bottom thereof,
    a bed of activated carbon for adsorbing said vapor thereon,
    means for supporting said bed of activated carbon-in said canister
    an outlet at the top of said canister comprising a burner for combustion of said vapor when air is admitted through said inlet,
    said burner comprising a flame holder having a pair of vapor barriers spaced vertically apart from one another and leaving an empty space therebetween and a plurality of burner nozzles extending through said barriers,
    said flame holder also having means for admitting air into said space between barriers to cool said nozzles.

9. Hydrocarbon vapor control unit, comprising in combination
    a canister having an inlet for said vapor at the bottom thereof,
    a bed of activated carbon in said canister,
    means for supporting said bed of activated carbon to adsorb said vapor thereon,
    an outlet at the top of said canister comprising a burner for combustion of said vapor when air is admitted through said inlet,
    a housing surrounding said canister and forming an annulus therebetween,
    three-way valve means for controllably connecting said inlet to the annulus between said housing and canister and to a conduit for said hydrocarbon vapor, and
    means for introducing air into said annulus for supporting combustion at said burner.

10. Hydrocarbon vapor control unit according to claim 9, wherein
    said burner comprises a flame holder, and
    spark electrode means for igniting said hydrocarbon vapor.

11. Hydrocarbon vapor control unit according to claim 9, further comprising
    means for detecting presence of said hydrocarbon vapor in said outlet.

12. Hydrocarbon vapor control unit according to claim 11, wherein
    said burner comprises a flame holder, and
    spark electrode means for igniting said hydrocarbon vapor.

13. Hydrocarbon vapor control unit according to claim 12, wherein
    said flame holder comprises a pair of vapor barriers spaced apart from one another, and
    a plurality of burner nozzles extending through said barriers.

14. Hydrocarbon vapor control unit according to claim 13, wherein said flame holder also comprises means for admitting air into said space between barriers to cool said nozzles.

15. Hydrocarbon vapor control unit according to claim 14, wherein
said burner also comprises a combustion chamber having heat conductive walls for preheating said inlet air in said annulus.

* * * * *